US012652269B2

(12) United States Patent
Nandyala et al.

(10) Patent No.: US 12,652,269 B2
(45) **Date of Patent: *Jun. 9, 2026**

(54) DYNAMIC TRAFFIC PRIORITIZATION ACROSS DATA CENTERS

(71) Applicant: VMware LLC, Palo Alto, CA (US)

(72) Inventors: Hussaina Begum Nandyala, Pune (IN); Gaurav Jindal, Pune (IN); Rasik Jesadiya, Pune (IN); Neeraj Mantri, Pune (IN)

(73) Assignee: VMware LLC, Palo Alto, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 18/801,261

(22) Filed: Aug. 12, 2024

(65) Prior Publication Data

US 2024/0406143 A1 Dec. 5, 2024

Related U.S. Application Data

(63) Continuation of application No. 17/706,643, filed on Mar. 29, 2022, now Pat. No. 12,063,204.

(30) Foreign Application Priority Data

Jan. 20, 2022 (IN) .............................. 202241003407

(51) Int. Cl.
*H04L 9/40* (2022.01)
*G06F 9/455* (2018.01)
(52) U.S. Cl.
CPC ...... *H04L 63/0272* (2013.01); *G06F 9/45558* (2013.01); *H04L 63/0254* (2013.01); *G06F 2009/45587* (2013.01)

(58) Field of Classification Search
CPC ............. H04L 63/0272; H04L 63/0254; G06F 9/45558; G06F 2009/45587

(Continued)

(56) References Cited

U.S. PATENT DOCUMENTS 11,736,559 B2 * 8/2023 Nair ........................ H04L 47/20
709/223
12,063,204 B2 8/2024 Nandyala et al.

(Continued)

OTHER PUBLICATIONS

U.S. Appl. No. 17/706,643, Non-Provisional Application filed Mar. 29, 2022, 27 pages.

(Continued)

*Primary Examiner* — Samson B Lemma
(74) *Attorney, Agent, or Firm* — King Intellectual Asset Management

(57) ABSTRACT

The disclosure provides an approach for processing communications between connected data centers. Embodiments include receiving, at a first gateway of a first data center from a second gateway of a second data center, one or more policies associated with traffic attributes. Embodiments include programming priority routes between the first gateway and the second gateway over a virtual private network (VPN) tunnel based on the one or more policies, wherein each of the priority routes is associated with a traffic attribute of the traffic attributes. Embodiments include providing the one or more policies to a central controller of the first data center and programming, by the central controller, one or more tables associated with a centrally-managed virtual switch based on the one or more policies. Embodiments include updating a database associated with each of a plurality of hosts based on the programming of the one or more tables.

20 Claims, 6 Drawing Sheets

(58) Field of Classification Search
USPC ............................................................ 726/15
See application file for complete search history.

(56) References Cited

U.S. PATENT DOCUMENTS

| | | | | |
|---|---|---|---|---|
| 2004/0148520 | A1* | 7/2004 | Talpade .............. | H04L 63/1458 |
| | | | | 726/22 |
| 2014/0068703 | A1* | 3/2014 | Balus ...................... | H04L 63/20 |
| | | | | 726/1 |
| 2016/0080280 | A1* | 3/2016 | Ramachandran ..... | H04L 45/302 |
| | | | | 370/235 |
| 2016/0080285 | A1* | 3/2016 | Ramachandran ..... | H04L 47/825 |
| | | | | 709/223 |
| 2017/0063667 | A1* | 3/2017 | Maskalik ............ | H04L 43/0852 |
| 2017/0063674 | A1* | 3/2017 | Maskalik ................ | H04L 12/66 |
| 2018/0109450 | A1* | 4/2018 | Filsfils .................... | H04L 45/04 |
| 2019/0361750 | A1* | 11/2019 | Sequeira .............. | H04L 9/3268 |
| 2021/0218598 | A1* | 7/2021 | Ganapathy .............. | H04L 45/64 |
| 2022/0335340 | A1* | 10/2022 | Moustafa ............... | G06N 20/00 |
| 2023/0231831 | A1 | 7/2023 | Nandyala et al. | |
| 2023/0362236 | A1* | 11/2023 | Nair ................... | H04L 67/1001 |

OTHER PUBLICATIONS

U.S. Appl. No. 17/706,643, Notice of Allowance dated Apr. 9, 2024, 47 pages.

* cited by examiner

Data Center 130

Controller 136

Manager 138

126

Host(s) 105

VCI 135₁     VCI 135₂     ...     VCI 135ₙ

Hypervisor 116

Hardware Platform 106

Gateway 134

Network 110

Data Center(s) 140

132

300

| Type | Resource pool | Reservation | Shares | Limit | Priority |
|------|---------------|-------------|--------|-------|----------|
| Site Recovery | IpSubnet1/prefix | 10 mbps | 5000 | | 50 |
| Compute VCI | IpSubnet2/prefix2 | 3 Mbps | 1500 | | 15 |
| iSCSI | IpSubnet3/prefix3 | 8 Mbps | 4000 | | 40 |
| VCI Migration | IpSubnet4/prefix4 | 6 Mbps | 3000 | | 30 |
| Management | IpSubnet5/prefix5 | 20 Mbps | 10000 | | 100 |
| ... | IpSubnet6/prefix6 | | | | |

Edge VM 216

Config
Agent 210₃ ------install priority routes---- 402

IKE Service 410

----priority routes

404

QoS SA
DB
424 priority routes---- Datapath Service 420

406 priority routes

SA DB
422

Figure 5:
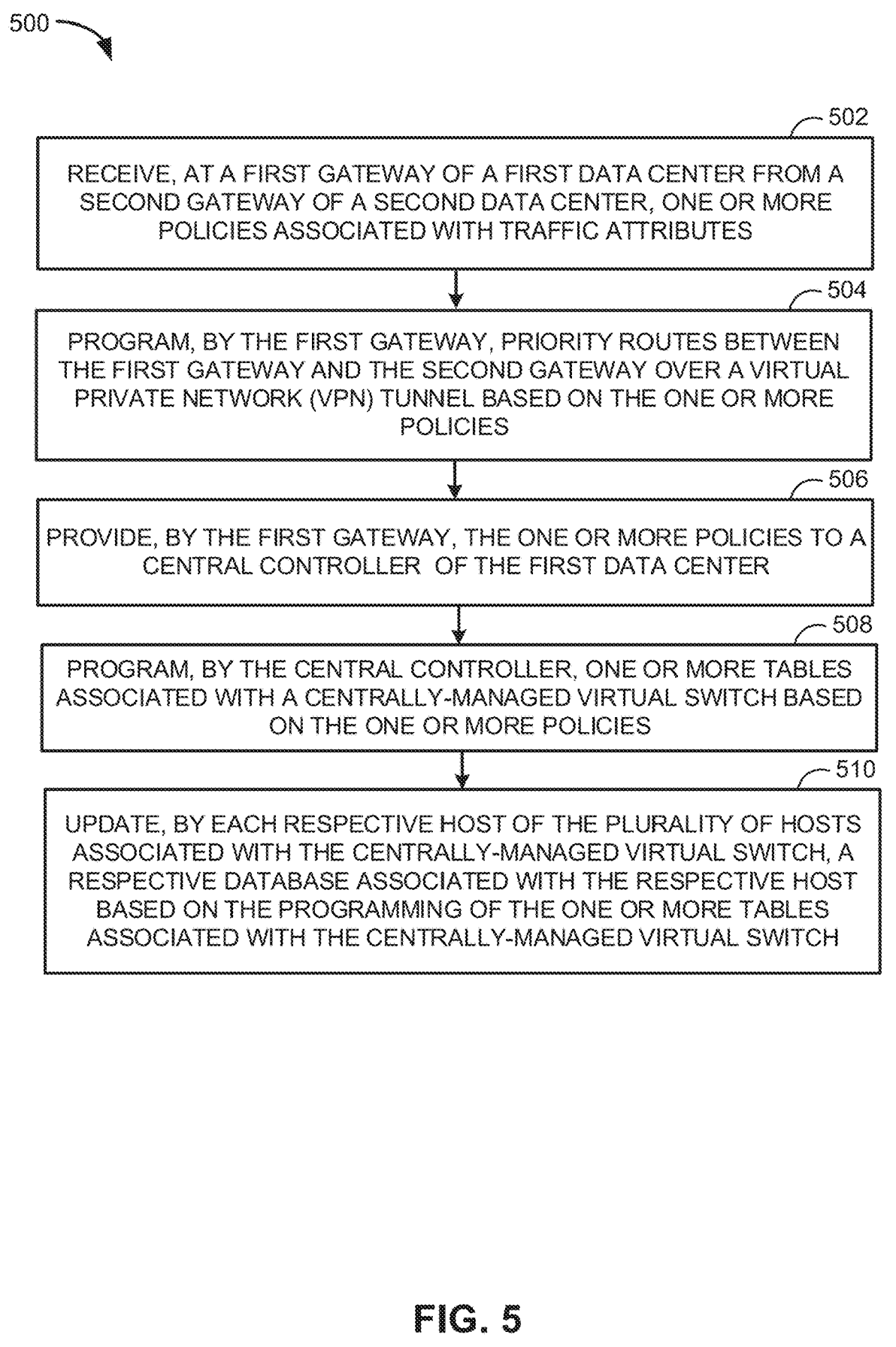

500

502

RECEIVE, AT A FIRST GATEWAY OF A FIRST DATA CENTER FROM A SECOND GATEWAY OF A SECOND DATA CENTER, ONE OR MORE POLICIES ASSOCIATED WITH TRAFFIC ATTRIBUTES

504

PROGRAM, BY THE FIRST GATEWAY, PRIORITY ROUTES BETWEEN THE FIRST GATEWAY AND THE SECOND GATEWAY OVER A VIRTUAL PRIVATE NETWORK (VPN) TUNNEL BASED ON THE ONE OR MORE POLICIES

506

PROVIDE, BY THE FIRST GATEWAY, THE ONE OR MORE POLICIES TO A CENTRAL CONTROLLER OF THE FIRST DATA CENTER

508

PROGRAM, BY THE CENTRAL CONTROLLER, ONE OR MORE TABLES ASSOCIATED WITH A CENTRALLY-MANAGED VIRTUAL SWITCH BASED ON THE ONE OR MORE POLICIES

510

UPDATE, BY EACH RESPECTIVE HOST OF THE PLURALITY OF HOSTS ASSOCIATED WITH THE CENTRALLY-MANAGED VIRTUAL SWITCH, A RESPECTIVE DATABASE ASSOCIATED WITH THE RESPECTIVE HOST BASED ON THE PROGRAMMING OF THE ONE OR MORE TABLES ASSOCIATED WITH THE CENTRALLY-MANAGED VIRTUAL SWITCH

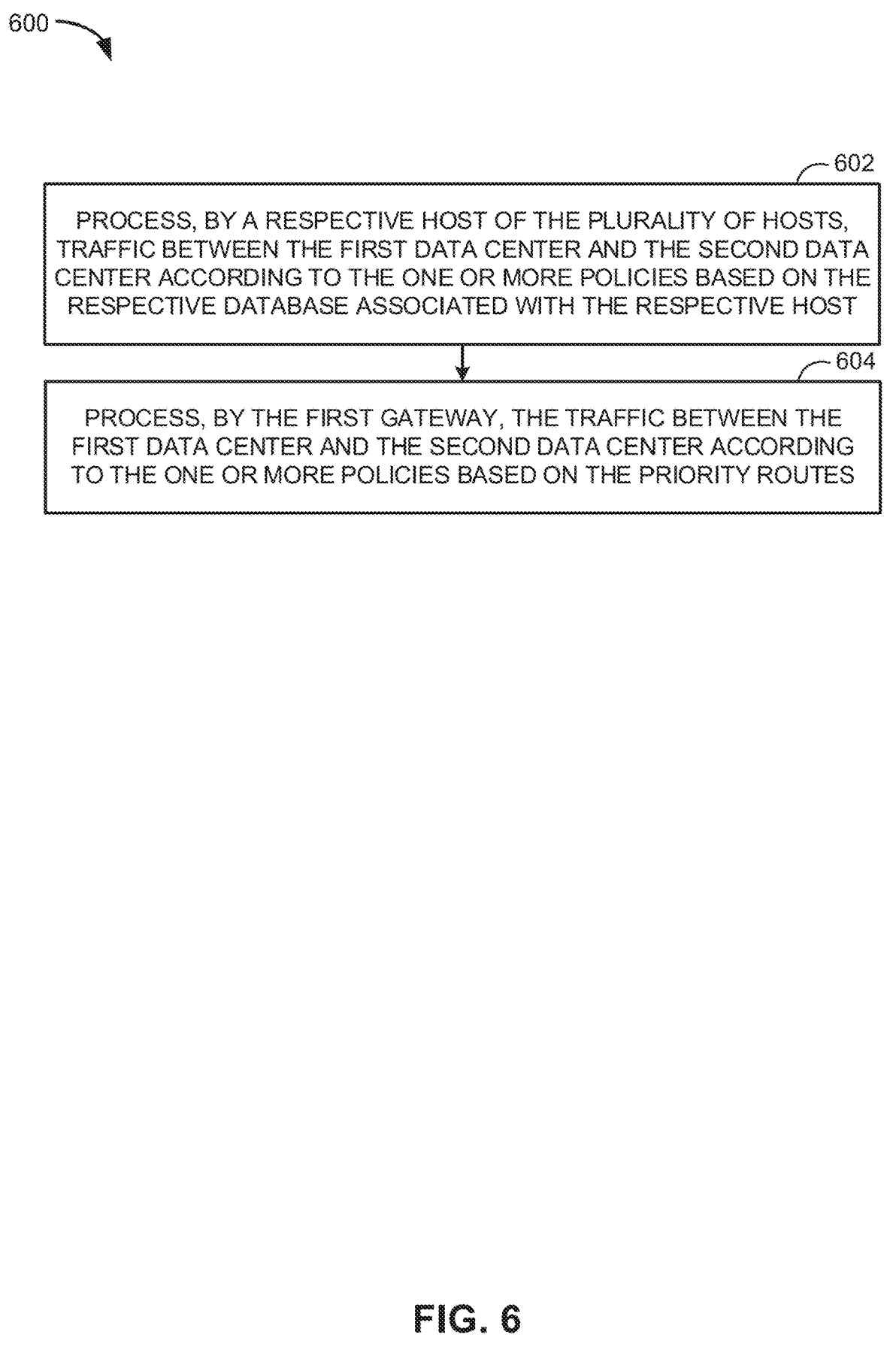

PROCESS, BY A RESPECTIVE HOST OF THE PLURALITY OF HOSTS, TRAFFIC BETWEEN THE FIRST DATA CENTER AND THE SECOND DATA CENTER ACCORDING TO THE ONE OR MORE POLICIES BASED ON THE RESPECTIVE DATABASE ASSOCIATED WITH THE RESPECTIVE HOST

604

PROCESS, BY THE FIRST GATEWAY, THE TRAFFIC BETWEEN THE FIRST DATA CENTER AND THE SECOND DATA CENTER ACCORDING TO THE ONE OR MORE POLICIES BASED ON THE PRIORITY ROUTES

FIG. 6

DYNAMIC TRAFFIC PRIORITIZATION ACROSS DATA CENTERS

CROSS-REFERENCES

This application is a continuation of U.S. patent application Ser. No. 17/706,643 filed Mar. 29, 2022, entitled "DYNAMIC TRAFFIC PRIORITIZATION ACROSS DATA CENTERS", of which is a continuation of India patent application No. 202241003407 filed Jan. 20, 2022, entitled "DYNAMIC TRAFFIC PRIORITIZATION ACROSS DATA CENTERS", the entirety of which both are incorporated herein by reference.

BACKGROUND

A software defined datacenter (SDDC) provides a plurality of host computer systems (hosts) in communication over a physical network infrastructure of a datacenter such as an on-premise datacenter or a cloud datacenter. Each host has one or more virtualized endpoints such as virtual machines (VMs), containers, or other virtual computing instances (VCIs). These VCIs may be connected across the multiple hosts in a manner that is decoupled from the underlying physical network, which may be referred to as an underlay network. The VCIs may be connected to one or more logical overlay networks which may be referred to as software-defined networks (SDNs) and which may each span multiple hosts. The underlying physical network and the one or more logical overlay networks may use different addressing. Though certain aspects herein may be described with respect to VMs, it should be noted that the techniques herein may similarly apply to other types of VCIs.

Any arbitrary set of VCIs in a datacenter may be placed in communication across a logical Layer 2 network by connecting them to a logical switch. A logical switch is collectively implemented by at least one virtual switch on each host that has a VCI connected to the logical switch. Virtual switches provide packet forwarding and networking capabilities to VCIs running on the host. The virtual switch on each host operates as a managed edge switch implemented in software by the hypervisor on each host. As referred to herein, the terms "Layer 2," "Layer 3," etc. refer generally to network abstraction layers as defined in the OSI model. However, these terms should not be construed as limiting to the OSI model. Instead, each layer should be understood to perform a particular function which may be similarly performed by protocols outside the standard OSI model. As such, methods described herein are applicable to alternative networking suites.

A logical Layer 2 network infrastructure of a datacenter may be segmented into a number of Layer 2 (L2) segments, each L2 segment corresponding to a logical switch and the VCIs coupled to that logical switch. A datacenter may implement a layer 2 virtual private network (L2VPN) to extend one or more L2 segments of the datacenter. Each L2 segment extended by the L2VPN may secure the connection using a security protocol such as an IP security (IPsec) protocol. IPsec protocols are widely used to protect packets communicated between endpoints, such as over the Internet, between gateways, between datacenters (e.g., on premises datacenters, cloud datacenters, etc.), within datacenters, etc. For example, the endpoints (e.g., VCIs, gateways, hosts, etc.) may be configured with IPsec protocols to engage in an internet key exchange (IKE) negotiation process to establish an IKE tunnel. An IKE tunnel allows for the endpoints to further establish an IPsec tunnel to provide security associations (SAs) between the endpoints. In some embodiments, each SA is a one-way or simplex connection and, therefore, at least two SAs are established between two endpoints-one for each direction. Endpoints with an IPsec tunnel established between them may also be referred to as IPsec peers. Each SA is a form of contract between the IPsec peers detailing how to exchange and protect information exchanged between the IPsec peers. In some implementations, each SA uses a mutually agreed-upon key, one or more security protocols, and/or a security parameter index (SPI) value. Each IPsec peer has an IPsec virtual tunnel interface (VTI) that provides a routable interface for terminating IPsec tunnels. Packets transmitted through the VTI will be encrypted and sent through IPsec tunnel. Accordingly, after SAs have been established between two endpoints, an IPsec protocol may be used to protect data packets for transmission through the VTI.

There are various types of traffic that may be transmitted over an L2VPN between connected datacenters, such as management traffic, infrastructure traffic, application traffic, site recovery traffic, hybrid cloud extension traffic, workload traffic, service insertion traffic, VCI migration traffic, and/or the like. In some cases bandwidth conflicts may arise between different types of traffic being transmitted over the L2VPN, such as due to congestion or oversaturation of the underlying network. A bandwidth conflict generally refers to a case where two or more packets cannot be simultaneously processed at a device due to insufficient available bandwidth at the device (e.g., at an uplink and/or downlink port of a gateway or other device). For example, a bandwidth conflict might be determined to exist whenever the available bandwidth at a device falls below a threshold. With existing techniques, there is no mechanism for adjudicating such bandwidth disputes in an intelligent manner that is based on types of traffic.

Accordingly, there is a need in the art for techniques of intelligently adjudicating bandwidth disputes related to traffic transmitted between data centers.

It should be noted that the information included in the Background section herein is simply meant to provide a reference for the discussion of certain embodiments in the Detailed Description. None of the information included in this Background should be considered as an admission of prior art.

BRIEF DESCRIPTION OF THE DRAWINGS

FIG. 3 depicts an example of a table related to dynamic traffic prioritization across data centers.

FIG. 5 depicts example operations related to dynamic traffic prioritization across data centers.

FIG. 6 depicts additional example operations related to dynamic traffic prioritization across data centers.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for traffic prioritization between data centers that are connected to one another, such as via a virtual private network (e.g., an L2VPN).

According to certain embodiments, prioritization policies may indicate relative priorities with respect to types of traffic. For example, prioritization policies may be user-defined (e.g., by a network administrator via the management plane of a data center) and/or may be system-generated (e.g., based on network conditions, such as bandwidth utilization and types of traffic flowing between data centers). Techniques described herein relate to distributing and implementing such policies on data center components, such as to ensure that high-priority types of traffic are favored for transmission across connected data centers in the event of a bandwidth conflict. For example, embodiments of the present disclosure allow service level agreements (SLAs) to be defined in order to provide quality of service (QOS) functionality for particular types of traffic transmitted across data centers. An SLA generally defines the level of service that a customer expects from a service provider, laying out the metrics by which service is measured. QoS refers to a description or measurement of the overall performance of a service. For instance, an SLA may indicate that a certain QoS is required, and providing that QoS may require that a certain amount of bandwidth be available to the customer for processing and transmission of packets.

Figure 1:
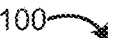
FIG. 1 is an illustration of example physical and virtual network components with which embodiments of the present disclosure may be implemented.

FIG. 1 is an illustration of example physical and virtual network components with which embodiments of the present disclosure may be implemented.

Networking environment 100 includes data center 130 connected to network 110. Network 110 is generally representative of a network of machines such as a local area network ("LAN") or a wide area network ("WAN"), a network of networks, such as the Internet, or any connection over which data may be transmitted.

Data center 130 generally represents a set of networked machines and may comprise a logical overlay network. Data center 130 includes host(s) 105, a gateway 134, a data network 132, which may be a Layer 3 network, and a management network 126. Host(s) 105 may be an example of machines. Data network 132 and management network 126 may be separate physical networks or different virtual local area networks (VLANs) on the same physical network.

One or more additional data centers 140 are connected to data center 130 via network 110, and may include components similar to those shown and described with respect to data center 130. Communication between the different data centers may be performed via gateways associated with the different data centers. In particular embodiment, one or more of data centers 140 are connected to data center 130 via a VPN connection such as an L2VPN.

Each of hosts 105 may include a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 for multiple virtual computing instances (VCIs) 1351 to 135n (collectively referred to as VCIs 135 and individually referred to as VCI 135) that run concurrently on the same host. VCIs 135 may include, for instance, VMs, containers, virtual appliances, and/or the like. VCIs 135 may be an example of machines.

In certain aspects, hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. It is noted that the term "operating system," as used herein, may refer to a hypervisor. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Gateway 134 provides VCIs 135 and other components in data center 130 with connectivity to network 110, and is used to communicate with destinations external to data center 130 (not shown). Gateway 134 may be implemented as one or more VCIs, physical devices, and/or software modules running within one or more hosts 105. For example, gateway 134 may be connected to a corresponding gateway in a data center 140 via a VPN connection.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user. In certain embodiments, a user defines traffic prioritization policies via manager 138, such as indicating relative priorities of different types of traffic that may flow across data centers 130 and 140.

As described in more detail below with respect to FIG. 2, traffic prioritization policies may be user or system defined.

Policies furthermore may be centrally defined and distributed via controller 136 or from an orchestrator (not shown) to a local configuration agent that is implemented on each of hosts 105 or locally defined at each host, e.g., using a configuration file or settings. The traffic prioritization policies are also installed within gateway 134 (e.g., via updates to one or more tables) and pushed by gateway 134 to a corresponding gateway in a remote data center 140 that is connected to data center 130, such as via a VPN. The prioritization policies are then installed within the corresponding gateway in the remote data center 140 and may be distributed throughout the remote data center 140 in a similar manner to the distribution of the prioritization policies throughout data center 130.

Thus, the prioritization policies are implemented across data center 130 and the connected remote data center 140, such as by granting larger amounts of available bandwidth to higher-priority traffic than to lower-priority traffic when a bandwidth conflict occurs (e.g., due to congestion or oversaturation of the VPN and/or the underlying network).

Figure 2:
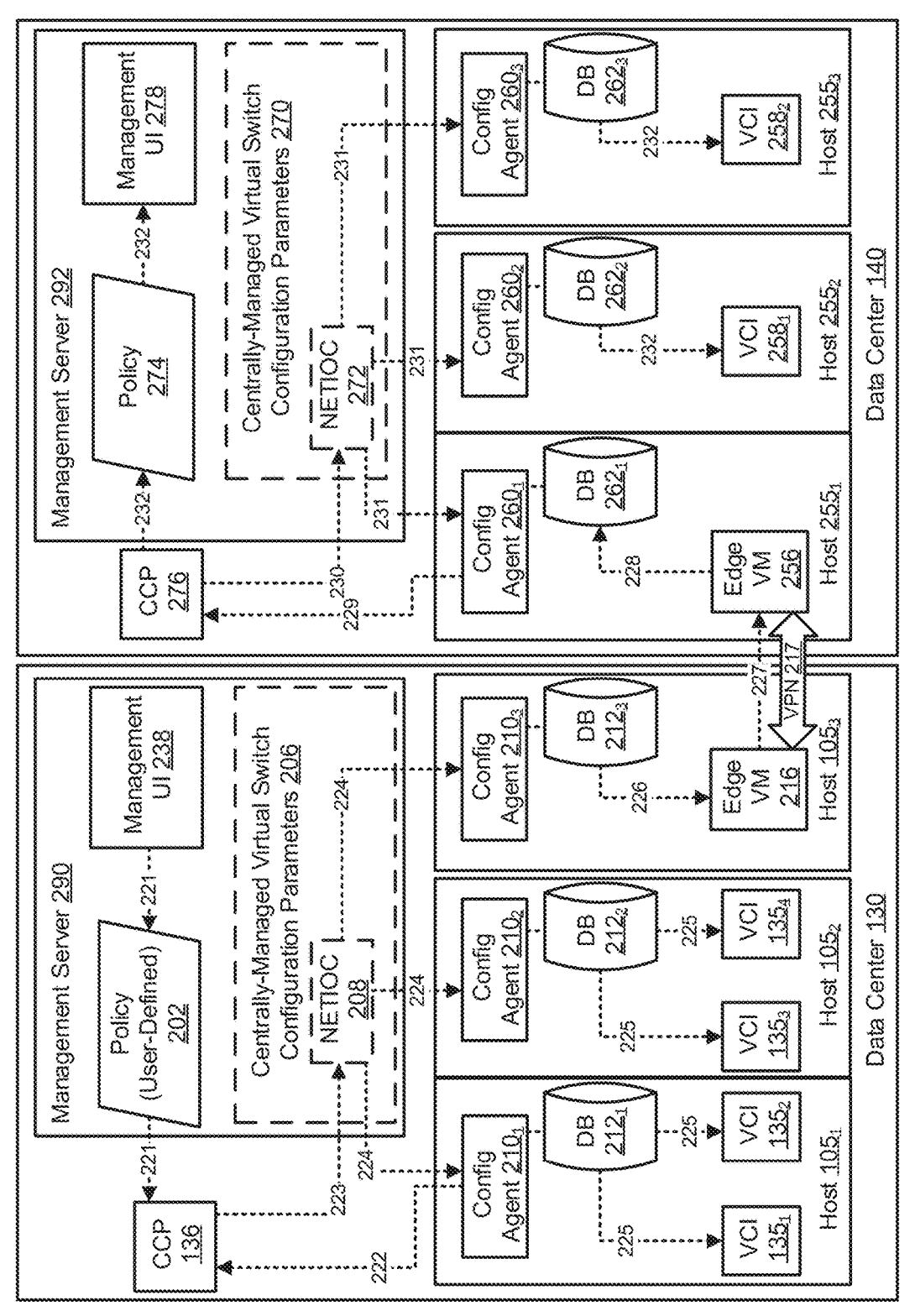
FIG. 2 is an illustration of an example of distributing traffic prioritization policies for implementation across connected data centers.

FIG. 2 shows an environment 200 for distributing traffic prioritization policies for implementation across connected data centers. Environment 200 includes data centers 130 and 140, hosts 105, VCIs 135, and CCP 136 previously described with reference to FIG. 1. Data centers 130 and 140 are connected to one another via a VPN 217, which may represent an L2VPN, between edge VM 216 and edge VM 256. Each edge VM is a virtual machine that executes edge services gateway (ESG) software and can be thought of as a virtual gateway appliance. The ESG software may provide a number of network services for connected software-defined networks such as firewall, load balancing, intrusion detection, domain name, DHCP, and VPN services. While gateways are shown here implemented on virtual machines, it is also possible to implement them directly on dedicated physical computer hardware (i.e., without a hypervisor layer). In the illustrated environment 200, edge VM 216 is a VM running on host 105₃ that implements gateway 134 (FIG. 1) and edge VM 256 similarly implements a gateway of data center 140.

Data center 130 comprises centrally-managed virtual switch configuration parameters 206, which comprise configuration parameters of a centrally-managed virtual switch (e.g., with virtual ports that are implemented on a plurality of hosts 105₁₋₃), such as a virtual distributed switch (VDS). It is noted that, while certain embodiments are described with respect to a VDS, other embodiments may involve other types of centrally-managed virtual switches, such as open virtual switches (OVSwitches). Centrally-managed virtual switch configuration parameters 206 reside on a management server 290 (e.g., which may, in some embodiments, correspond to manager 138 of FIG. 1), and corresponds to a data plane component (e.g., virtual switches and virtual ports) that resides on the hosts 105₁₋₃ associated with the centrally-managed virtual switch. Each of hosts 105₁₋₃ may implement a separate virtual switch corresponding to centrally-managed virtual switch configuration parameters 206 and the virtual switches at each host may be managed as a single virtual switch across the hosts 105₁₋₃. Centrally-managed virtual switch configuration parameters 206 can have multiple Layer 2 (L2) networking configuration profiles, including one or more network I/O configuration (NETIOC) table(s) 208 (e.g., residing on the management server 290 as well as locally on each host 105₁₋₃). An L2 networking configuration profile such as a NETIOC table 208 includes configuration details for virtual switches and virtual ports, including the centrally-managed virtual switch and its associated virtual ports. For example, NETIOC table(s) 208 can include a Quality-of-Service (QOS) profile, an IP address discovery profile, a security profile, and a medium access control (MAC) management profile. An L2 networking configuration profile can be used to provide high-quality and dedicated network resources for preferred traffic that requires a high bandwidth and high QoS and for allocating network bandwidth to business-critical applications.

It is noted that centrally-managed virtual switch configuration parameters 206 correspond to one centrally-managed virtual switch (e.g., VDS, OVS, or the like), and additional centrally-managed virtual switches may also be present on data center 130, each having their own configuration parameters (and, in some embodiments, separate NETIOC tables).

Configuration agents 210 may be implemented in the hypervisor (FIG. 1), and may be referred to as a local control plane (LCP). Configuration agents 210 may receive configuration updates sent by CCP 136 and configures components of the host 105, including virtual switches that implement centrally-managed virtual switch configuration parameters 206, based on the configuration updates. Each of hosts 105 further comprises a switch database (DB) 212, which stores information related to the centrally-managed virtual switch, including local copies of NETIOC table(s) 208 on the individual host 105. Similarly, each of hosts 255 on data center 140 comprises a configuration agent 260 and a switch DB 262.

An example data flow begins at step 221, where a user-defined policy 202 is provided by management user interface (UI) 238 (e.g., based on input provided by an administrator to a UI associated with managing data center 130) to CCP 136. Policy 202 may, for instance, indicate relative priorities associated with types of traffic. In one example, policy 202 indicates that management traffic (e.g., traffic related to management of data centers 130 and 140, such as traffic to and/or from management servers 290 and 292 and/or CCPs 136 and 276) has a relative priority of 100, VCI migration traffic (e.g., traffic related to migration of VCIs between hosts) has a relative priority of 30, general compute VM traffic (e.g., traffic related to ordinary operations of compute VMs) has a relative priority of 15, critical application traffic (e.g., traffic related to one or more particular applications considered critical) has a relative priority of 50, and/or the like. In an example, a higher relative priority value means a higher priority, or the opposite could be true (e.g., a lower relative priority value could mean a higher priority). Priorities may indicate how much available bandwidth should be allotted to particular types of traffic in the event of a bandwidth conflict. In some embodiments, types of traffic are identified in a policy by an address (e.g., IP address) such as a subnet address (e.g., routing prefix identified by a subnet mask applied to a source and/or destination IP address of the packet). For instance, management traffic may be identified by a subnet address associated with manager 138 and/or CCP 136 such that any traffic to and/or from that subnet (e.g., having a routing prefix of the source and/or destination IP address of the packet corresponding to the subnet) will be treated as management traffic for the prioritization purposes.

In some embodiments, a user can define policies based on static and/or dynamic criteria. For example, a policy may specify that traffic associated with any workload that is connected to a particular centrally-managed virtual switch is assigned a given priority (e.g., which is a dynamic criterion, as associations between workloads and virtual switches may change over time). In another example, a policy may specify that traffic associated with a particular workload is assigned a particular priority (e.g., which is a static criterion).

Additionally or alternatively to step 221, at step 222 a system-generated policy is provided to CCP 136 by configuration agent 2101. For instance, the system-generated policy may be generated on host 105 based on observed network and/or application conditions. For instance, if analytic data indicates that management traffic has substantially increased during a certain time window, then a system-generated policy may assign a higher priority to management traffic than was previously assigned in order to ensure that the management traffic is transmitted and processed quickly across data centers 130 and 140. Subsequently, if management traffic decreases, a new system-generated policy may reduce the priority of management traffic.

Policies defined at steps 221 and/or 222 may be examples of SLAs that define QoS parameters.

At step 223, CCP 136 programs a NETIOC table 208 associated with centrally-managed virtual switch configuration parameters 206 based on the manual and/or system-generated policies. For instance, as described in more detail below with respect to FIG. 3, CCP 136 may create one or more entries in the NETIOC table 208 (e.g., maintained on management server 290) indicating the relative priorities associated with the traffic types (e.g., identified by subnet addresses) indicated in the policy or policies. The table entries may also indicate bandwidth reservation amounts, bandwidth shares, bandwidth limits, and/or the like, all of which may be based on the priority assigned to each traffic type (e.g., these values may be proportional to the priorities and/or otherwise derived from the priorities).

At step 224, configuration agents 2101-3 on hosts 1051-3 receive the priority information from the policy or policies, such as based on the table entries being written to the NETIOC table 208. For example, configuration agents 2101-3 may be subscribed to the NETIOC table 208, and may be notified of any changes. Configuration agents 2101-3 may configure the virtual switches on each of hosts 1051-3 based on the priorities, which may comprise writing the entries from the NETIOC table 208 to local switch DBs 2121-3. Furthermore, at step 225, VCIs 1351-4 receive the priority information, such as through subscriptions to switch DBs 2121-2. For example, virtual ports (e.g., which may be configured as distributed virtual ports) on VCIs 1351-4 may be programmed with the NETIOC parameters (e.g., reservation, share, limit, and/or the like) to ensure that service level agreements (SLAs) with respect to the different types of traffic are met on the virtual ports. For instance, a virtual switch may have a number of virtual ports, each of which may be responsible for forwarding packets to a different VCI. In some embodiments, each virtual port is connected to a respective VCI's VNIC and is configured to forward traffic that is destined for the VCI to the VM's VNIC.

Similarly, edge VM 216 receives the priority information, such as through a subscription to switch DB 2123. For example, an IKE daemon running on edge VM 216 may monitor switch DB 2123 for any change (e.g., add/modify), such as through a subscription, and will be notified of the priority information being written to switch DB 2123.

In certain embodiments, edge VM 216 validates the priority information before taking action based on it. For example, edge VM 216 may check a vendor identifier associated with priority information to ensure that data centers 130 and 140 are compatible with one another (e.g., associated with the same vendor of computing services) and/or that both data centers 130 and 140 support traffic prioritization functionality.

Edge VM 216 programs one or more priority routes based on the priority information. For example, as described in more detail below with respect to FIG. 4, edge VM 216 may store priorities in association with routes (e.g., subnets), according to the priority information, in a security association (SA) table. A priority route may indicate a subnet corresponding to a particular traffic type and an associated priority (e.g., based on a user-defined or system-defined prioritization policy). In some embodiments, as described below with respect to FIG. 4, priority routes are stored in a SA table specifically for QoS SA information that is separate from a global SA table so that priority routes can be located more quickly (e.g., due to the faster lookup process in a separate smaller table). For example, a QoS SA table may include only entries related to priority routes (e.g., without including non-priority routes), while a global SA table may include non-priority routes (e.g., in addition to priority routes). A priority route is associated with a priority value, while a non-priority route is not associated with a priority value. In one example, an SA table comprises a hash map in which entries can be looked up by SPI, destination address (e.g., routing prefix of the destination address corresponding to a subnet), and/or protocol.

At step 227, edge VM 216 in data center 130 transmits the priority information to edge VM 256 in data center 140, such as over VPN 217. In one example, edge VM 216 transmits the priority information to edge VM 256 via an IKE control channel.

Subsequently, edge VM 256 programs priority routes (e.g., in an SA table) based on the priority information in a similar manner to that described with respect to edge VM 216. In some embodiments, edge VM 256 programs priority queues based on the priority information. Edge VM 256 may first validate the priority information, such as based on a vendor identifier associated with the priority information, before programming priority routes and/or queues and/or before sending the priority information further in data center 140.

At step 228, edge VM 256 writes one or more entries to switch DB 2621 based on the priority information, and configuration agent 2601 is notified of this update to switch DB 2621. At step 229, configuration agent 2601 provides the priority information to CCP 276. At step 230, CCP 276 programs the NETIOC table 272 associated with centrally-managed virtual switch configuration parameters 270 based on the priority information and, at step 232, CCP 276 provides policy 274 to management UI 278. For instance, policy 274 may represent one or more user-defined and/or system-generated policies corresponding to the policies defined on data center 130 at steps 221 and/or step 222, and may be provided to management UI 278 so that it can be viewed and/or edited by an administrator.

At step 231, configuration agents 2601-3 receive the priority information that was written to the NETIOC table 272, and configure components such as virtual switches corresponding to centrally-managed virtual switch configuration parameters 270 on hosts 2551-3 based on the priority information. For example, configuration agents 2601-3 create local copies of the entries that were written to the NETIOC table 272 in local switch DBs 2621-3. At step 232, VCIs 2581-2 receive the priority information, such as based on subscriptions to switch DBs 2622-3, and virtual ports of VCIs 2581-2 are programmed with the NETIOC parameters. It is noted that edge VM 256 does not need to receive the priority information from switch DB 2621 because it already received the priority information from edge VM 216 at step 227.

Once the priority information has been distributed throughout data centers 130 and 140 as described above, inter-SDDC packets may be prioritized accordingly as they travel throughout data centers 130 and 140. For example, the source and/or destination address routing prefix (corresponding to a subnet) of a packet may be used to identify applicable table entries (e.g., in the tables that were programmed as described herein) for determining how to process, route, and/or allot bandwidth to transmission of the packets, such as by identifying priorities associated in the tables with source and/or destination address routing prefixes of particular packets.

It is noted that prioritization logic described herein may, in some embodiments, only be employed when there is a bandwidth conflict. For example, if there is sufficient bandwidth to handle all packets currently being processed at a node (e.g., virtual switch, gateway, or the like), then there is no need to prioritize one packet over another. However, if there is insufficient bandwidth to handle all packets currently being processed at the node, then the node will utilize prioritization logic described herein to adjudicate the bandwidth conflict, such as assigning a greater share of available bandwidth to higher-priority packets, reserving a greater amount of available bandwidth for higher-priority packets, processing higher-priority packets prior to lower-priority packets, and/or the like based on applicable programming (e.g., NETIOC table information, SA table information, and/or the like). In an example, a gateway or centrally-managed virtual switch determines priorities associated with two packets, and processes (e.g., transmits) the packet with the higher priority prior to processing the packet with the lower priority. In another example, a gateway or centrally-managed virtual switch may send x packets of a first type (e.g., of a higher priority) for every y (e.g., less than x) packets of a second type (e.g., of a lower priority). Rather than evaluating the x:y ratio on a packet-by-packet basis, the evaluation can be in terms of bytes of data, such that for every x bytes of transmitted data of the first type, y bytes of data of the second type are transmitted. In yet another example, if a first packet type is associated with a given bandwidth reservation amount in a NETIOC table, then a centrally-managed virtual switch associated with the NETIOC table may only transmit packets of types other than the first packet type to the extent that these transmissions do not cause the available bandwidth to fall below the given bandwidth reservation amount. In some cases, bandwidth reservation amounts are only enforced when the available bandwidth falls below a threshold. It is noted that subnets are generally relied upon as indicators of traffic type according to techniques described herein. For example, an assumption may be made that all traffic associated with a given subnet is of a particular traffic type.

Tables on each of data centers 130 and 140 (e.g., NETIOC tables 208 and 272, tables in DBs 212 and 262, and tables maintained by edge VM 216) may include entries corresponding to subnets on both data centers 130 and 140. For example, if management traffic is assigned a certain priority across data centers 130 and 140, then applicable tables on data center will associate the particular priority with the subnet of management server 290 on data center 130 as well as the subnet of management server 292 on data center 140 (which may, in some embodiments, be a single stretched subnet that includes both management servers 290 and 292).

In some cases, if the source subnet and the destination subnet of a packet are mapped to different entries with different priorities in a given table, then this conflict may be resolved by applying the higher priority to the packet, applying the lower priority to the packet, applying an average of the two priorities to the packet, or through some other conflict resolution technique. However, in most cases there will be no conflict between the priorities assigned to a source subnet and a destination subnet of a given packet, as endpoints of a given type of traffic generally share a subnet or would have subnets that are assigned the same priorities.

Certain techniques described herein may be referred to as tagging. For example, the entries stored in NETIOC table 208, switch DBs, and/or tables at gateways may be referred to as tags by which particular endpoints associated with certain subnets (e.g., VCIs, applications, and/or the like) are tagged with priorities.

In some embodiments, a synchronization service is used to synchronize priority information across data centers. In one example, a synchronization service implements a state-based replication service and allows diverse types of data to be synchronized using sync providers. The providers provide an interface to data storage and semantics while the sync framework takes care of orchestrating the sync session, detection of conflicts, and how to resolve them. For example, such a synchronization service may be used to synchronize NETIOC information and edge priority information across data centers.

FIG. 3 depicts an example of a table 300 related to dynamic traffic prioritization across data centers. For example, table 300 may correspond to a NETIOC table 208 of FIG. 2.

Table 300 includes associations between types of traffic (identified by subnet prefixes) and bandwidth reservation amounts, bandwidth shares, bandwidth limits, and relative priorities.

The example types of traffic depicted in table 300 include site recovery traffic (e.g., traffic related to failover and/or other data recovery processes) represented by IPSubnet1/prefix, compute VCI traffic represented by IPSubnet2/prefix2, ISCSI (Internet Small Computer Systems Interface) traffic represented by IPsubnet3/prefix3, VCI migration traffic represented IPSubnet4/prefix4, management traffic represented by IPSubnet5/prefix5, and another unlabeled type of traffic represented by IPSubnet6/prefix6.

The reservation amounts may represent the amount of available bandwidth that should be reserved for each given type of traffic in the event of a bandwidth conflict, and may be determined based on the total amount of available bandwidth at a given time and the priorities. The share amounts may represent the relative shares of available bandwidth that should be allotted to each given type of traffic. The limit values may represent the maximum amount of bandwidth that should be allotted to each given type of traffic. It is noted that the limits are blank in table 300 because it is often considered a best practice not to set bandwidth limits (e.g., to ensure that all available bandwidth is effectively utilized and to avoid unnecessary delays in transmission of traffic). The priority value represent the relative priorities of each respective type of traffic.

In some embodiments, the bandwidth reservation amounts, bandwidth shares, and/or bandwidth limits are directly proportional to the priorities.

Figure 4:
FIG. 4 is an illustration of an example related to installing priority routes by a gateway.

FIG. 4 is an illustration 400 of an example related to installing priority routes by a gateway. Illustration 400 includes configuration agent 2103 and edge VM 216 of FIG. 2.

At step 402, configuration agent 2103 issues instructions to IKE service 410 to install one or more priority routes. In some embodiments, IKE service 410 to generate SAs for secure communication between gateways in accordance with the IKE protocol. In some embodiments, SAs are established for inbound and outbound traffic between gateways. The SAs include a mutually agreed-upon encryption key, one or more security protocols, and/or a security parameter index (SPI) value for use in securely communicating packets between gateways. By establishing SAs among themselves, gateway 115 and gateway 125 effectively establish what may be referred to as an internet protocol security (IPsec) tunnel to protect data packets transmitted between the gateways. In some embodiments, each SPI value is a value associated with a SA, which enables a gateway to distinguish among multiple active SAs. As an example, SPI values may be used to distinguish between the inbound and outbound SAs of a certain IPsec tunnel. While IPsec is a popular standard for securing VPN connections, the principles of the technology described herein may use other VPN security mechanisms.

Information related to SAs may be maintained by a datapath service 420, such as in a SA DB 422. At step 404, IKE service 410 provides the priority routes to datapath service 420 for storage in a DB at step 406. In some embodiments, datapath service 420 stores the priority routes in the standard SA DB 422, while in other embodiments datapath service 420 stores the priority routes in a separate QoS SA DB 424 that is specifically for priority routes. In some cases, step 406 involves storing priority routes in both SA DB 422 (e.g., the global SA DB) and QoS SA DB 424. QOS SA DB 422 may be advantageous, as it is a smaller DB that allows lookups to be performed more efficiently. Priority routes may indicate routes (e.g., subnets) that are associated with particular priorities.

In some cases, IKE exchanges between gateways include an exchange of vendor identifiers by which each gateway indicates to the other gateway whether QoS support is available on the gateway. Thus, each gateway may be able to validate, based on the vendor identifier received from the other gateway, whether the other gateway supports traffic prioritization techniques described herein prior to transmitting or otherwise processing priority information related to the other gateway.

As described above, FIG. 4, presents an example method of propagating priority routes from config agent to one or more local databases via IKE service 410. It should be noted, however, that other mechanisms may be implemented for propagating this data. For example a local control agent running as a daemon or service (not shown) within edge VM 216 may receive priority route information from config agent 210 via a hypercall or backdoor mechanism enabling side channel communication between the edge VM 216 and config agent 210 which resides in the hypervisor. The local control agent can then store the priority route information directly into the local database without involving IKE service 410 or datapath service 420. Alternatively, a local control agent running within edge VM 216 may communicate with the central control plane to receive priority route information directly therefrom, e.g., via a network connection over a management network 126.

FIG. 5 depicts example operations 500 related to dynamic traffic prioritization across data centers. For example, operations 500 may be performed by one or more components of data centers 130 and/or 140 of FIG. 1.

Operations 500 begin at step 502, with receiving, at a first gateway of a first data center from a second gateway of a second data center, one or more policies associated with traffic attributes.

In some embodiments, the one or more policies comprise: one or more user-defined policies received via a management plane of the second data center; or one or more system-defined policies generated at one or more hosts of the second data center. In certain examples, the one or more policies are received by the first gateway via an internet key exchange (IKE) control channel.

Operations 500 continue at step 504, with programming, by the first gateway, priority routes between the first gateway and the second gateway over a virtual private network (VPN) tunnel based on the one or more policies. In some embodiments, each priority route of the priority routes is associated with a given traffic attribute of the traffic attributes. Traffic attributes may, for example, comprise routing prefixes (e.g., corresponding to subnets).

Operations 500 continue at step 506, with providing, by the first gateway, the one or more policies to a central controller of the first data center. In some embodiments, the first gateway generates one or more updates to a database associated with a host on which the first gateway is located, a configuration agent on the host receives the one or more policies based on the one or more updates, and the configuration agent provides the one or more policies to the central controller of the first data center.

Operations 500 continue at step 508, with programming, by the central controller, one or more tables associated with a centrally-managed virtual switch based on the one or more policies. In some embodiments, the one or more tables associated with the centrally-managed virtual switch comprise one or more network input/output (I/O) control tables comprising configuration information related to allocating bandwidth to packets by the centrally-managed virtual switch. The centrally-managed virtual switch may, for example, be a virtual switch that is centrally managed from a management plane, such as a VDS or OVS.

Operations 500 continue at step 510, with updating, by each respective host of a plurality of hosts (e.g., other than the host on which the gateway is located) associated with the centrally-managed virtual switch, a respective database associated with the respective host based on the programming of the one or more tables associated with the centrally-managed virtual switch.

Certain embodiments further comprise validating, by the first gateway, the one or more policies based on a vendor identifier associated with the second data center.

Some embodiments further comprise programming one or more virtual ports associated with one or more virtual machines based on updating, by each respective host of the plurality of hosts associated with the virtual switch, the respective database associated with the respective host.

FIG. 6 depicts additional example operations 600 related to dynamic traffic prioritization across data centers. For example, operations 600 may be performed by one or more components of data centers 130 and/or 140 of FIG. 1.

Operations 600 begin at step 602, with processing, by a respective host of the plurality of hosts, traffic between the first data center and the second data center according to the one or more policies based on the respective database associated with the respective host.

Operations 600 continue at step 604, with processing, by the first gateway, the traffic between the first data center and the second data center according to the one or more policies based on the priority routes.

In some embodiments, processing, by the respective host of the plurality of hosts, the traffic between the first data center and the second data center according to the one or more policies based on the respective database associated with the respective host comprises determining that a first packet having a first traffic attribute and a second packet having a second traffic attribute cannot be simultaneously processed based on an amount of available bandwidth, determining, based on the respective database, that the first traffic attribute has a higher priority than the second traffic attribute, and processing the first packet prior to the second packet based on the higher priority of the first traffic attribute. The first traffic attribute may, for example, comprise a routing prefix identified by a subnet mask applied to a source or destination internet protocol (IP) address of the first packet. The second traffic attribute may, similarly, comprise a routing prefix identified by a subnet mask applied to a source or destination internet protocol (IP) address of the second packet.

In certain embodiments, processing, by the first gateway, the traffic between the first data center and the second data center according to the one or more policies based on the priority routes comprises identifying, in a security association (SA) table, a priority route of the priority routes that is associated with the first packet, and determining a priority of the first packet based on a priority associated with the priority route in the SA table. For example, the SA table may be a priority SA table that does not include non-priority routes and is separate from a global SA table associated with the first gateway that includes the non-priority routes.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method, comprising:

receiving, by a central controller of a first data center and from a first gateway of the first data center, one or more policies associated with traffic attributes, wherein the first gateway is programmed with priority routes between the first gateway and a second gateway of a second data center over a virtual private network (VPN) tunnel based on the one or more policies; and programming, by the central controller, one or more tables associated with a centrally-managed virtual switch based on the one or more policies, wherein:

programming the one or more tables associated with the centrally-managed virtual switch causes each respective host of a plurality of hosts associated with the centrally-managed virtual switch to update a respective database associated with the respective host;

the respective updated database of each respective host of the plurality of hosts causes that respective host to process traffic between the first data center and the second data center according to the one or more policies; and the one or more policies cause one of the hosts to:

determine that a first packet having a first traffic attribute and a second packet having a second traffic attribute cannot be simultaneously processed based on an amount of available bandwidth;

determine, based on the respective database, that the first traffic attribute has a higher priority than the second traffic attribute; and process the first packet prior to the second packet based on the higher priority of the first traffic attribute.

2. The method of claim 1, wherein the central controller runs as a virtual appliance.

3. The method of claim 1, wherein the central controller is implemented as a distributed or clustered system.

4. The method of claim 1, wherein the first traffic attribute comprises a routing prefix identified by a subnet mask applied to a source or destination internet protocol (IP) address of the first packet.

5. The method of claim 1, wherein the one or more policies comprise at least one of:

one or more user-defined policies received via a management plane of the second data center; or one or more system-defined policies generated at one or more hosts of the second data center.

6. The method of claim 1, wherein the one or more tables associated with the centrally-managed virtual switch comprise one or more network input/output (I/O) control tables comprising configuration information related to allocating bandwidth to packets by the centrally-managed virtual switch.

7. The method of claim 1, wherein, each priority route of the priority routes is associated with a given traffic attribute of the traffic attributes.

8. A non-transitory computer-readable medium storing instructions that, when executed by one or more processors, cause the one or more processors to perform operations comprising:

receiving, by a central controller of a first data center and from a first gateway of the first data center, one or more policies associated with traffic attributes, wherein the first gateway is programmed with priority routes between the first gateway and a second gateway of a second data center over a virtual private network (VPN) tunnel based on the one or more policies; and programming, by the central controller, one or more tables associated with a centrally-managed virtual switch based on the one or more policies, wherein:

programming the one or more tables associated with the centrally-managed virtual switch causes each respective host of a plurality of hosts associated with the centrally-managed virtual switch to update a respective database associated with the respective host;

the respective updated database of each respective host of the plurality of hosts causes that respective host to process traffic between the first data center and the second data center according to the one or more policies; and the one or more policies cause one of the hosts to:

determine that a first packet having a first traffic attribute and a second packet having a second traffic attribute cannot be simultaneously processed based on an amount of available bandwidth;

determine, based on the respective database, that the first traffic attribute has a higher priority than the second traffic attribute; and process the first packet prior to the second packet based on the higher priority of the first traffic attribute.

9. The non-transitory computer-readable medium of claim 8, wherein the central controller runs as a virtual appliance.

10. The non-transitory computer-readable medium of claim 8, wherein the central controller is implemented as a distributed or clustered system.

11. The non-transitory computer-readable medium of claim 8, wherein the first traffic attribute comprises a routing prefix identified by a subnet mask applied to a source or destination internet protocol (IP) address of the first packet.

12. The non-transitory computer-readable medium of claim 8, wherein the one or more policies comprise at least one of:

one or more user-defined policies received via a management plane of the second data center; or one or more system-defined policies generated at one or more hosts of the second data center.

13. The non-transitory computer-readable medium of claim 8, wherein the one or more tables associated with the centrally-managed virtual switch comprise one or more network input/output (I/O) control tables comprising configuration information related to allocating bandwidth to packets by the centrally-managed virtual switch.

14. The non-transitory computer-readable medium of claim 8, wherein, each priority route of the priority routes is associated with a given traffic attribute of the traffic attributes.

15. A system, comprising:

one or more processors; and a non-transitory computer-readable medium storing instructions that, when executed by the one or more processors, cause the one or more processors to perform operations comprising:

receiving, by a central controller of a first data center and from a first gateway of the first data center, one or more policies associated with traffic attributes, wherein the first gateway is programmed with priority routes between the first gateway and a second gateway of a second data center over a virtual private network (VPN) tunnel based on the one or more policies; and programming, by the central controller, one or more tables associated with a centrally-managed virtual switch based on the one or more policies, wherein:

programming the one or more tables associated with the centrally-managed virtual switch causes each respective host of a plurality of hosts associated with the centrally-managed virtual switch to update a respective database associated with the respective host;

the respective updated database of each respective host of the plurality of hosts causes that respective host to process traffic between the first data center and the second data center according to the one or more policies; and the one or more policies cause one of the hosts to:

determine that a first packet having a first traffic attribute and a second packet having a second traffic attribute cannot be simultaneously processed based on an amount of available bandwidth;

determine, based on the respective database, that the first traffic attribute has a higher priority than the second traffic attribute; and process the first packet prior to the second packet based on the higher priority of the first traffic attribute.

16. The system of claim 15, wherein the central controller runs as a virtual appliance.

17. The system of claim 15, wherein the central controller is implemented as a distributed or clustered system.

18. The system of claim 15, wherein the first traffic attribute comprises a routing prefix identified by a subnet mask applied to a source or destination internet protocol (IP) address of the first packet.

19. The system of claim 15, wherein the one or more policies comprise at least one of:

one or more user-defined policies received via a management plane of the second data center; or one or more system-defined policies generated at one or more hosts of the second data center.

20. The system of claim 15, wherein the one or more tables associated with the centrally-managed virtual switch comprise one or more network input/output (I/O) control tables comprising configuration information related to allocating bandwidth to packets by the centrally-managed virtual switch.

\* \* \* \* \*